Dec. 4, 1951
F. J. MEYER ET AL
2,577,205
METHOD OF PRODUCING A FABRIC CONSTRUCTION
FOR REINFORCING PLASTICS AND PRODUCT
Filed Nov. 20, 1946
2 SHEETS—SHEET 1
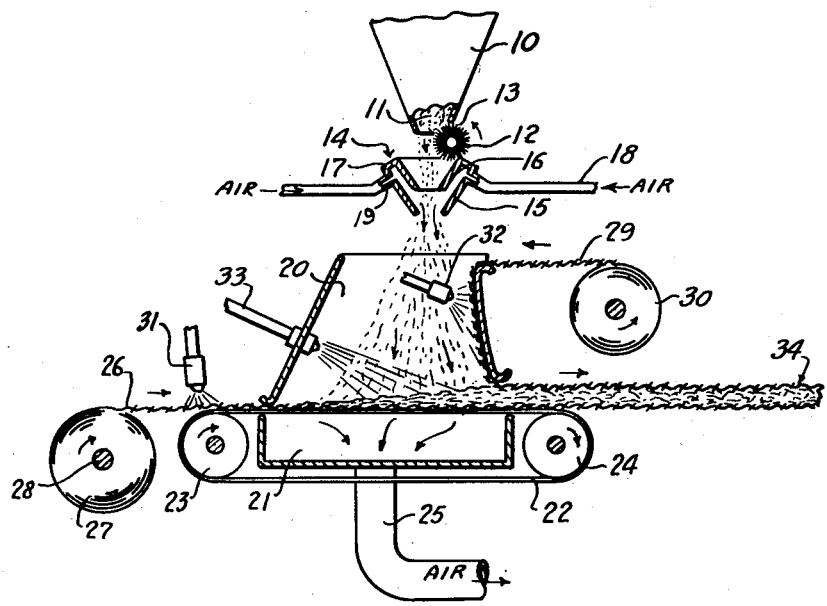
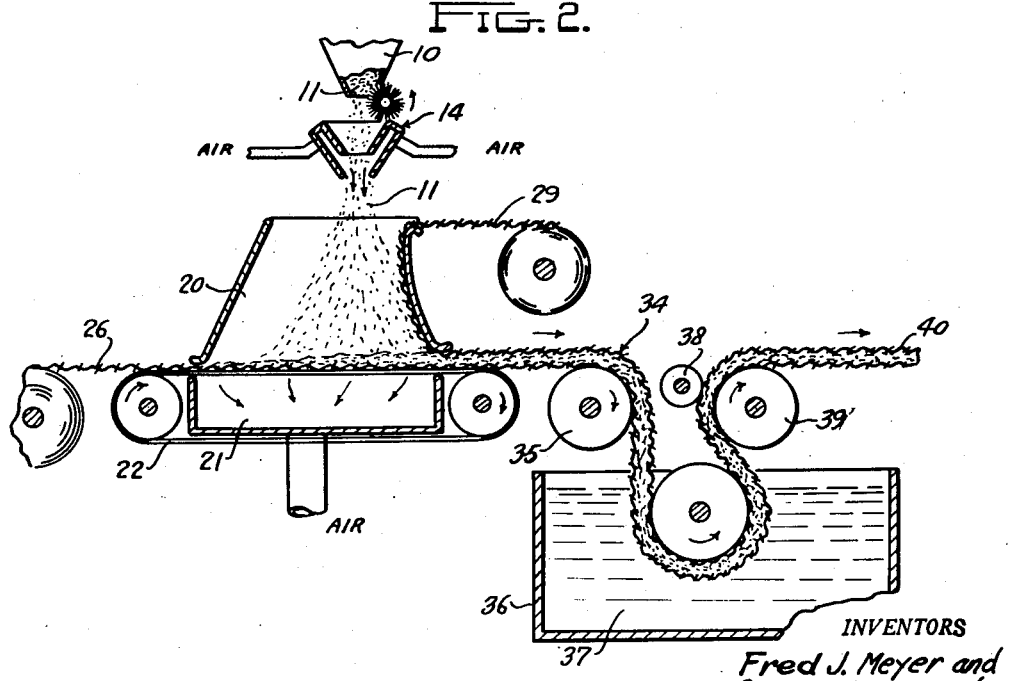
INVENTORS
Fred J. Meyer and
George K. Hammond
BY
Staelin & Overman
ATTORNEYS Dec. 4, 1951 F. J. MEYER ET AL 2,577,205
METHOD OF PRODUCING A FABRIC CONSTRUCTION
FOR REINFORCING PLASTICS AND PRODUCT
Filed Nov. 20, 1946 2 SHEETS—SHEET 2
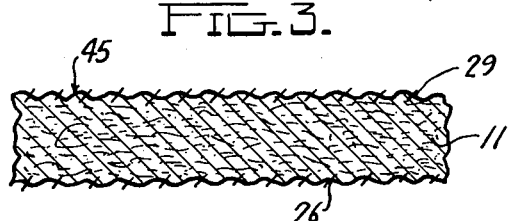
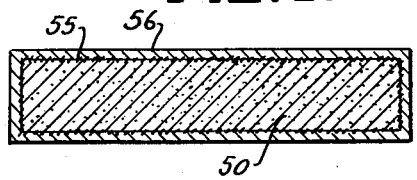
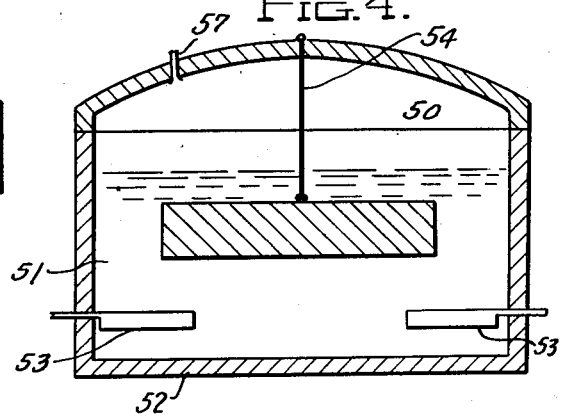
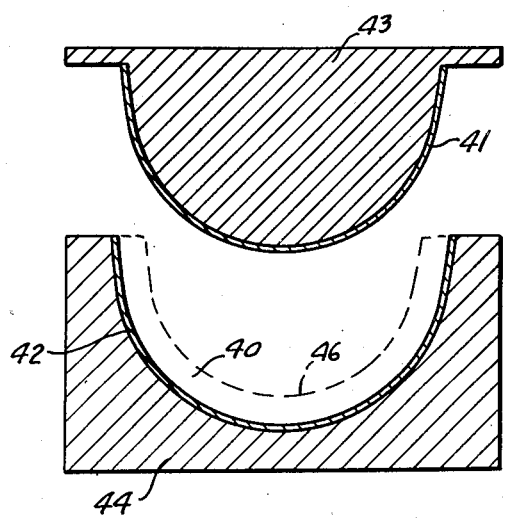
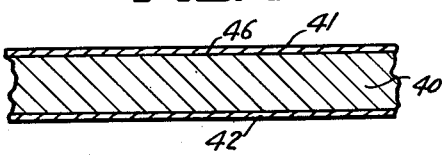
INVENTORS
Fred J. Meyer and
George K. Hammond
BY Staelin & Overman
ATTORNEYS Patented Dec. 4, 1951

2,577,205

UNITED STATES PATENT OFFICE 2,577,205

METHOD OF PRODUCING A FABRIC CONSTRUCTION FOR REINFORCING PLASTICS AND PRODUCT

Fred J. Meyer and George K. Hammond, Toledo, Ohio, assignors to Owens-Corning Fiberglas Corporation, Toledo, Ohio, a corporation of Delaware Application November 20, 1946, Serial No. 711,046

6 Claims. (Cl. 154—101)

This invention relates to molded or laminated plastics and to fabrics for reinforcing the same.

Articles molded from unmodified resinous materials generally are considered expensive and are known inherently to lack many desirable physical properties, such as strength, flexure, heat resistance, electrical resistance, moisture resistance or the like.

In order to reduce the cost of the relatively expensive resinous materials, low cost fillers, in the form of wood flour or other paper or cellulose waste products are ordinarily added in amounts ranging up to 60% by weight of the product. Other fillers are usually incorporated not only to reduce the cost of the resinous material when possible but, also, to modify the resulting physical properties such as when inert or non-absorbent fillers are added to increase the moisture resistance or electrical properties. The heat resistance of the plastic materials may be increased by the addition of non-decomposable fillers, including the inorganic dusts, fibers, or sheets or grindings from various metals.

Presently considerable weight is given to the strength of the molded article which property is found to be dependent greatly upon the amount, type and the length of the fibers incorporated with the resinous materials.

In order to mold substantially large and complex articles from fibrous reinforced plastics, it has been found expedient to preshape the molding composition or the fibrous material substantially to conform to the contour of the mold so that after impregnation with resinous binders little composition flow is subsequently required during the molding operation. For this purpose, the long fiber materials, such as glass, cellulose, cotton, flax and asbestos have been interlocked paper-like in the form of a finished self-sustaining sheet or fabric. This material can be transported to the place of fabrication and there preformed and impregnated with resinous materials prior to the molding operation.

Obviously the additional costs for manufacturing finished sheets or textile fabrics from the materials described substantially increases the cost of the fibrous reinforcement. Thus, from the standpoint of costs alone it is a desideratum to eliminate or simplify the intermediate step of manufacturing a fabric of interwoven fibers for the reinforcement of plastic materials. For this purpose it is desirable to form the discontinuous fibers into a self-sustaining fabric which might be immediately impregnated with resinous binders for subsequent molding, or else sufficiently self-sustaining to enable transportation to distant points where the impregnation and fabrication might be effected without impairment of the fiber distribution or fabric continuity.

Heretofore, fabrics of discontinuous fibers have been made in which a substantially large percentage of resinous adhesive has been added to bind the fibers in the randomly arranged position and form a self-sustaining integral structure. However, the non-flexible binder ordinarily used militates against the free movement of adjacent fibers such that the extensibility and formability of the fabric is materially reduced, making it unsuitable for moldings other than ordinary flat sheet laminates.

Since, as previously pointed out, long fiber fillers militate against the free flow or complete intermingling of the resinous materials in the molding composition, novel means are afforded for modifying the physical, chemical and electrical properties, and even the appearance of the molded article. Thus, merely by the modification of the resins or materials forming the surface of the molded articles it is possible to incorporate other resins, ingredients or modifying agents in a relatively high concentration, which modified materials do not penetrate the entire molded article to impair the characteristics of the resins or fillers. In this manner, the resin concentration at the surface may be increased beyond that in the remainder of the molding composition to produce a smooth, glossy and highly resistant finish.

In addition, the surface resins or top ply may be pigmented sufficiently to result in a uniformly tinted molded article such that desirable and attractive colors may be produced at a minimum of pigmentation costs. Similarly, other resins or materials, which are comparatively expensive or which might impair the properties of the molded article, if incorporated throughout, can be introduced into the surface or top plies to impart certain desirable characteristics to the molded article. For example, expensive organo-silicon materials may be incorporated in the resins forming the surface of the molded article or laminate, such as to impart improved heat resistance and moisture repellency to the molded article, which moisture repellency may be far in excess of that obtained with any of the individual materials employed separately. Other means, such as bath impregnation, may be used to modify the surface of the molded articles to produce many of the desired characteristics described.

In view of the above, it is an object of this invention to produce a new and improved self-sustaining fabric consisting essentially of discontinuous fibers for the reinforcement of laminated or molded plastics.

Another object is to provide a fabric of fibrous materials that is light in weight and which can be deformed or stretched closely to fit a complex mold form without wrinkling, localized segregation or bunching of the fibers, and without danger of tearing or splitting the fabric.

A further object is to provide a new and improved molded article, reinforced with a fabric of interlocking fibers and faced with specially treated surface plies.

A still further object is to produce a molded article in which only the outside surface is modified to produce a desired appearance or vary the physical, chemical or electrical properties of the molded article.

A still further object is to produce a method for forming a self-sustaining fibrous fabric or for improving the physical, chemical or electrical properties or appearance of the molded article.

Other objects and advantages will hereinafter appear, and for purposes of illustration, but not of limitation, various embodiments of the invention are shown in the accompanying drawings, in which:

Figure 1 is a schematic view of the means for producing a self-sustaining fibrous fabric;

Figure 2 is a schematic view somewhat similar to that of Figure 1 for producing a fibrous fabric adapted particularly for immediate impregnation with resinous materials for subsequent molding operations;

Figure 3 is a longitudinal sectional view of an article molded from the impregnated fibrous fabric, illustrated in Figure 2;

Figure 4 is a diagrammatic illustration of a means for modifying the surface characteristics of the molded article by impregnation;

Figure 5 is a longitudinal sectional view of the molded article, the surfaces of which are modified, as by impregnation, with other materials;

Figure 6 illustrates yet another means for modifying the surfaces of the molded article; and Figure 7 is a longitudinal sectional view of the molded article having a modified surface evenly deposited by the means illustrated in Figure 6.

In part, this invention comprises a method for producing a fabric consisting of fibrous materials which, when collected on a surface in a naturally haphazard arrangement, become so felted and interlocked as to produce a structure having some degree of self-sufficiency, which structure is made completely self-sufficient by facing the mass on at least one side, but preferably on both opposite sides with an extensible loosely woven textile fabric. Thus, the mat of fibers may be conducted directly to the resin impregnating bath, or else transported to a desired place of fabrication without fear of segregation or separation of the fibers.

The fabric may be formed of any suitable fibrous materials, such as cotton, wood or farm products, but preferably is of randomly arranged glass fibers intertangled into an interlocking mat. Glass fibers are preferred in view of their strength, clarity, inertness, and non-absorbency enabling their efficient and beneficial use in structural molded or laminated products.

Referring to Figures 1 and 2 of the drawings, the numeral 10 indicates a hopper containing a supply of fibers 11 which, in this instance, are glass fibers cut or milled to substantially uniform small lengths for purposes aiding uniformity of feed and distribution. A feeder wheel 12 of the brush type is rotatably mounted such that its peripheral prongs 13 extend within the hopper in a manner continuously and evenly to displace a predetermined amount of the fibers 11.

A blower 14, having a pair of spaced, telescoped cones 15 and 16 integrally connected at their upper ends by a shoulder 17 is disposed directly beneath the hopper 11. A stream of air, continuously flowing through passages 18 and ports 19 into the space between the telescoped cones, is directed downwardly thereby, through the lower apex of the outer cone 16, which operates as a venturi, causing the then fiber-entrained air stream effectively to separate and distribute the fibers as a uniform cloud into a collecting chamber 20.

The upper and open end of a vacuum chamber 21 dimensionally similar to and substantially abutting the base of the collecting chamber 20, is covered by a continuous screen belt 22 operating on rotatable idlers 23 and 24, one of which functions as a drive for continuously moving the belt in the direction to the right over the suction chamber. The withdrawal of the air from the suction chamber through the passage 25 causes a sheet 26 of superposed extensible material to be drawn tightly against the moving belt 22. In this manner the sheet of textile fabric is continuously moved along the base of the collecting chamber, the fabric being unrolled from a bolt 27 mounted on a freely rotatable spindle 28.

The extensible textile sheets are preferably formed of knitted cloth of cotton, silk, rayon, fibrous glass or other synthetic or natural textile fibers. It is only necessary that the textile sheet 26 have sufficient stretch in all directions to deform to fit the contour of the mold and have sufficient voids for the passage of air therethrough into the suction chamber 21. Thus it is even possible to use non-rigid sheets of resinous materials or a fabric of extensible rubber-like material, particularly if the reinforcing fabric is to be impregnated with a rubber base or binder.

During the passage of the textile fabric 26 along the base of the collecting chamber 20, the fibers 11 therein, gravitationally and in cooperation with the suction from the chamber 21, settle and arrange themselves substantially uniformly and haphazardly upon the cloth. The movement of the textile fabric 26 is so regulated that the proper thickness of the fibers 11 are built up such as to be suitable for the subsequently desired molding operation. Obviously, greater volumes of air will be drawn through those parts of the textile sheet having less fibers deposited thereon, concentrating fiber deposition in that area until the coverage is uniform throughout.

The haphazardly arranged fibers are sufficiently interlocked and felted in themselves to form an integral light, glossy fabric, having a small degree of self-sufficiency. However, the textile sheet faced fibrous fabric has the inherent quality of mass integrity under stresses incident to normal handling, enabling the resulting fabric to be immediately treated, as by impregnation, for subsequent molding operations without fiber segregation or fabric disintegration. Even greater self-sufficiency is imparted if another sheet of extensible material 29 is disposed over the haphazardly arranged felted fibers. For this purpose, another roll 30 of extensible sheet material is arranged continuously to feed the sheet 29 over the massed fibers responsive to the frictional forces between the matted fibers and the superposed textile sheet, causing the same continuously to be withdrawn from the rotatably mounted bolt 30. If desired, the extensible sheets may be held more firmly to the matted fiber by depositing, as by spray guns 31 and 32, a thin film of adhesive material onto the inner faces of the extensible sheets 26 and 29. The resinous adhesives may comprise material such as are later to be used as the binder in the molded article or such other adhesive materials as starch, glue, latex or other synthetic or natural adhesive resins.

If still further self-sufficiency is desired, a small amount, less than 5 per cent and preferably about two per cent, of resinous binder may be injected into the collecting chamber for coating the fibers, as by a spray gun 33. It is important, however, to control the amount of resins deposited, because impairment of the subsequent movement of the matted fibers relative to each other renders them unsuitable in later forming operations. We have found that the small amount of resins described aid self-sufficiency without causing the fibers so strongly to be bonded together that they will resist the application of slight forces tending to move one fiber in relation to adjacent ones.

The light weight and substantially bulky textile fabric 29, resulting from these operations, enables the ready manufacture of reinforced plastic articles of complex shape. The uniform distribution of the long fibers yields a high strength molded article having less weight than a reinforced plastic fabricated from a more dense woven textile sheet.

In the event that the resinous impregnation and fabrication of the fabric into a molded article are to follow immediately after the fabrication of the mat itself, it has been found inadvisable to add the small amounts of adhesive resins previously described. In such event, the fabric faced fibrous mat 34 is led over the tension roller 35 and into a tank 36 containing a bath 37 of the impregnating resin, in the form of a solution, dispersion or emulsion of the resinous materials in suitable solvents or liquids or, else, the resinous material as a hot melt in liquid form.

Suitable impregnating resins may comprise thermosetting materials, which are converted first to a plastic state, in response to heat and pressure, and subsequently to a rigid, infusible and insoluble state, such that the article molded may be removed from the forming dies while hot.

Such thermosetting resins include the phenol, urea, melamine, cresylic acid or resorcinol reaction products, with formaldehyde, furfuraldehyde, or other aldehydes, which resins are ordinarily applied as a partially reacting resin in a solution, emulsion or dispersion in suitable solvents.

Suitable thermosetting resins may also include polymerization type materials, which are converted from the monomeric stage directly and quickly to the cured state without the formation of reaction products, and may be impregnated into the fibrous fabric 29 in a liquid monomeric form or as a partially polymerized solution. The latter resins may consist of polymers or copolymers, selected from the group of allyl compounds or their derivatives, such as allyl alcohol, methallyl alcohol or the like, polyesters which are the reaction products of polyhydric alcohols with polycarboxylic acids, styrene derivatives, or acrylic acid and ester derivatives, all having sufficient reactive groups to form a cross-linkage responsible for the thermosetting properties.

The fibrous mat or fabric 29 may also be impregnated with thermoplastic resinous materials in monomeric or polymerized form, in which case, during the molding operation, the formed molding composition is cooled to below the critically set temperature for the resin, so that the molded article may be removed from the mold without deformation.

Included amongst the thermoplastic materials suitable for such purposes are the cellulose derivatives, including the esters, such as cellulose acetate, cellulose acetate-butyrate, cellulose propionate, or the like, cellulose ethers, including ethyl cellulose, methyl cellulose, nitro cellulose, or the like, acrylic resins, polystyrenes, and their halogenated derivatives, polyamides, polyvinyl acetates, chlorides, acetals or copolymers thereof, vinylidene chlorides or the organo-silicon compounds, commonly known as silicone resins.

When it is desired to produce a reinforced cured rubber article, the textile sheets 26 and 29 may consist of rubber-like material and the bath 27 of uncured rubber or latex in the form of a solution or emulsion, enabling the composition of matter to be converted in the mold to the cured or vulcanized form under heat and pressure.

The presence of the uncured or partially cured liquid resinous materials advantageously operates as a lubricant enhancing the relative movement of the fibers such that the fabric is readily stretchable and deformable more closely to fit molds of even complex and sharp curvatures without segregation or bunching of the fibers and without danger of tearing, or splitting of the fabric. The extensible sheets covering the felted fibers or mat holds the core in compression during the shaping operation preventing undue thinning out of the fiber core, and operates also as a surface modifier of the molded article 45.

As previously pointed out, in manufacturing high strength materials of the type described, through the use of long fiber fillers, very little movement of the resinous materials or the fibers takes place during the compression cycle. Thus, the resinous or filler composition of the outer ply will remain substantially the same before and after the molding cycle. In this manner, the composition of the surface of the molded article may be varied to add to the properties or appearance of the molded article without disturbing the inner composition so that the desirable characteristics of the molded article be retained.

For this purpose, films 41 and 42 of a resinous material which is substantially the same as that used for impregnating the fabric, may be deposited on the surface of each of the mold dies 43 and 44, respectively. When the coacting dies with the films thereon are brought into intimate contact with the resinous impregnated molding material 40 the applied resinous films are united with the resinous impregnant to become the integral outer ply or surface 46 of the molded article.

In this manner, merely by coating the mold surfaces with pure resin, the resin concentration on the surface of the molded article may be substantially increased to impart a smooth, glossy, highly resistant finish to the molded article.

Similarly, the resinous films deposited on the mold surfaces may be highly pigmented to any desired color, to deposit a uniform colored film when fused to the surface of the molded article. In addition, considerable savings result from the use of less high cost pigment, in view of the fact that only an amount sufficient to color the surface is needed.

Other resins having more resistant properties may be fused to the surface of the molded article, there to act as a protective coating, or else a more highly plasticized resin of the same composition as the binder or other plasticizer resins may be fused thereon to increase the surface toughness and flexibility of the molded article. The addition of lubricants into the surface resin composition will enhance the ease of removal of the molded article from the hot or cold dies.

In a like manner, numerous other properties may be imparted to the molded article by the modification of the resinous composition comprising the films 41 and 42 deposited on coacting mold surfaces. For example, fairly high percentages of organo-silicon compounds may be incorporated with substantially any one of the resinous materials suitable for impregnation to impart increased heat resistance and water repellency to the entire molded article. Moldings have been made where the heat resistance of a phenol formaldehyde molded article has been increased some 50 degrees centigrade merely by addition of 33 per cent by weight of dimethyl polysiloxane. In addition, the water repellency is improved beyond that derived from either material individually enabling its more advantageous use in electrical apparatus.

Other means may be used for modifying the surface characteristics of the molded article, making the article more suitable in various applications.

One other such means consists in the impregnation of the surfaces of the molded article 50 with various materials, resins or oils with or without pigment. It is understood that the amount and rate of impregnation is substantially increased with an increase in bath temperature such that impregnation procedures usually prescribed for a bath maintained at or near its boiling temperature. Further increases in the rate of impregnation may be made through the use of increased pressures to force materials into the interstices of the mold article or into more intimate contact with the molded article.

One such impregnating bath is illustrated in Figure 4 and includes an impregnation tank 52 containing the impregnating material 51, heated by immersion heaters 53 and in which the molded article 50 is suspended by means of a rod 54.

By this means, it is possible to concentrate amounts of organo-silicon oils or resins 55 in the surface, and on the surface as a film 56, of the molded article to impart the desired beneficial results previously described. Adequate impregnation of a phenol-formaldehyde laminate with the organso-silicon oil, which may be dimethyl polysiloxane, may be made by immersion of the article, for five hours in a bath 51 heated to 300° C. It is understood that the time for impregnation might be considerably shortened through the use of increased pressures in the impregnation tank. The impregnation tank may be fitted with a valve 57 for admitting air to or exhausting the air from the tank.

The present invention thus permits the ready manufacture of reinforced plastic articles of complex shapes with a mat of fabric having haphazardly arranged fibers uniformly distributed throughout the mat such as to impart low weight and high strength uniformly throughout the whole article.

This invention also provides means for modifying the characteristics and appearance of the molded article in an economical, simple and beneficial manner.

Numerous other changes in the arrangement in operation of the mat forming, and molded surface modifying means may be made without departing from the spirit of the invention, especially as defined in the following claims.

We claim:

1. A reinforcement for plastics comprising a body of intermatted haphazardly related glass fibers, a major face of the body being covered with a stretchable knitted glass fabric adding integrity of mass structure to the body and enabling the retention of its structure during manipulation.

2. A reinforcement for plastics comprising a body of discontinuous interlaced fibers disposed between extensible sheets of knitted textile glass fabric, and a resinous adhesive distributed through said body and binding the fibers of said body together.

3. A reinforcement for rubber, plastics and the like, comprising a mass of randomly arranged glass fibers, a sheet of stretchable knitted glass fabric covering a major face of said mass, and a resinous adhesive bonding said sheet to said mass.

4. An article of manufacture as claimed in claim 2, in which the resinous adhesive is a thermosetting synthetic resin constituting about 2 to 5 per cent by weight of the mass of fibers.

5. The method of continuously producing a deformable fabric of felted fibers which comprises passing a stream of gas ladened with fibers into one end of and through a chamber, continuously moving a knitted fabric sheet in one direction past the other end of said chamber, passing the gas stream through the fabric and filtering it out and collecting the fibers on said fabric in the form of a mat of haphazardly arranged fibers, continuously moving a second fabric through said chamber in a direction converging on the path of movement of the first fabric, whereby to gather the deposited mat fibers between said two fabrics, and adhering the sheets and mat of fibers together to form a composite fabric.

6. The method of continuously producing a deformable textile product of intermatted fibers, which comprises feeding air-borne fibers into one end of and through a chamber, continuously moving a stretchable knitted fabric in one direction past the other end of said chamber, withdrawing the air from said chamber through said knitted fabric, thereby to filter out said fibers from the suspending air and deposit the fibers on the fabric in a random arrangement, building the deposited fibers up into a mat on said fabric, continuously moving a second knitted fabric through said chamber in a direction to converge on the first fabric to gather the mat fibers between said two fabrics, and applying a binding agent to the mat of fibers and the covering fabrics to bond them together into a composite textile product.

FRED J. MEYER.
GEORGE K. HAMMOND.

REFERENCES CITED

The following references are of record in the file of this patent:

UNITED STATES PATENTS

| Number | Name | Date |
|---|---|---|
| 1,164,591 | Alexander | Dec. 14, 1915 |
| 1,194,254 | Sumner | Aug. 8, 1916 |
| 1,318,743 | Frederick | Oct. 14, 1919 |
| 1,336,403 | Weiss | Apr. 6, 1920 |
| 1,475,623 | Egerton | Nov. 27, 1923 |
| 2,010,857 | Hanson | Aug. 13, 1935 |
| 2,123,275 | Dym | July 12, 1938 |
| 2,152,901 | Manning | Apr. 4, 1939 |
| 2,164,499 | Coughlin | July 4, 1939 |
| 2,258,218 | Rochow | Oct. 7, 1941 |
| 2,295,971 | Savidge | Sept. 15, 1942 |
| 2,372,433 | Koon | Mar. 27, 1945 |
| 2,383,733 | Parker | Aug. 28, 1945 |
| 2,425,293 | McDermott | Aug. 12, 1947 |
| 2,439,689 | Hyde | Apr. 13, 1948 |